April 1, 1930.  R. W. WIESEMAN  1,752,871
DOUBLE SPEED, SYNCHRONOUS, DYNAMO ELECTRIC MACHINE
Filed June 21, 1929
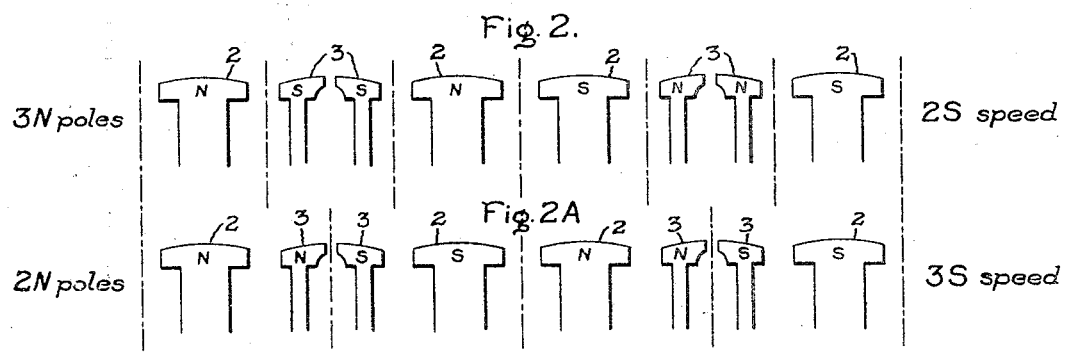
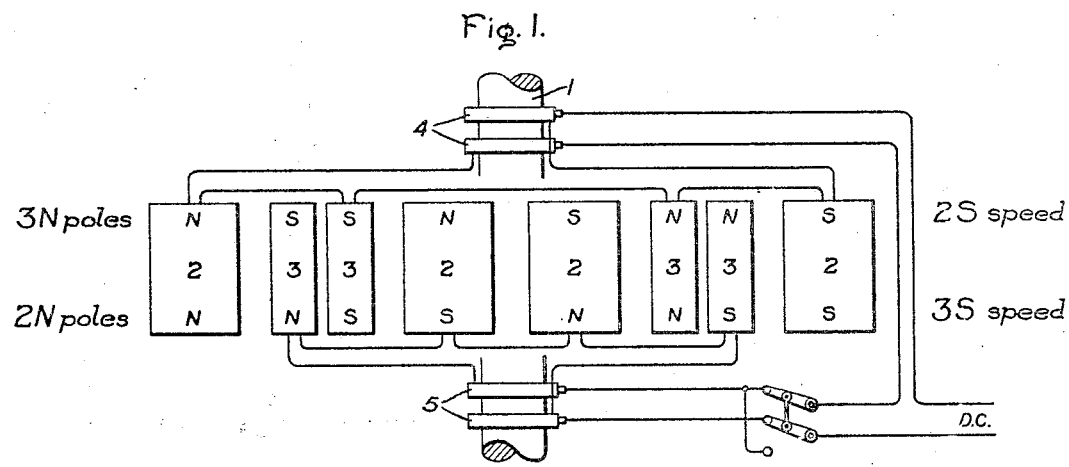
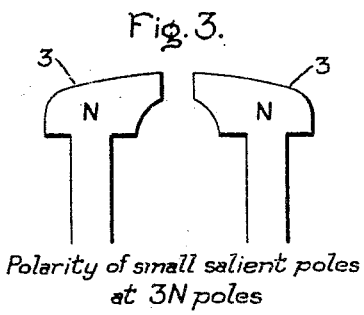
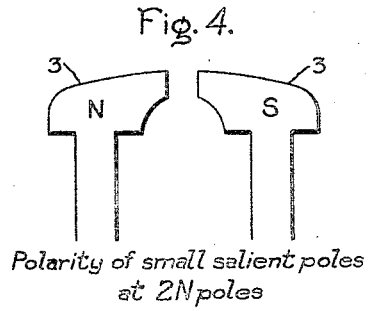
Inventor:
Robert W. Wieseman,
by Charles E. Tullar
His Attorney.

Patented Apr. 1, 1930

1,752,871

UNITED STATES PATENT OFFICE

ROBERT W. WIESEMAN, OF SCHENECTADY, NEW YORK, ASSIGNOR TO GENERAL ELECTRIC COMPANY, A CORPORATION OF NEW YORK

DOUBLE-SPEED, SYNCHRONOUS, DYNAMO-ELECTRIC MACHINE

Application filed June 21, 1929. Serial No. 372,765.

My invention relates to dynamo electric machines and its principal object is to provide a novel arrangement of the pole pieces whereby such a machine will have two efficient operating speeds when used as a synchronous generator or synchronous motor. A further object of my invention is to provide a simple circuit arrangement for the exciting windings of the magnetic field whereby they may be quickly changed from one number of poles to another number of poles, and whereby the induced potential across these windings will be kept at low values when the machine is started as an alternating current motor.

During the operation of water-wheel driven generators it not infrequently occurs that the head of water varies to such an extent as to make the water wheel synchronous generator combination very inefficient in its operation when operated at its rated speed and it becomes desirable to operate the combination at a different speed where its operation is more efficient. It is well known to those skilled in the art that with a fixed number of poles on a generator its frequency will vary in direct proportion to its speed and conversely with a fixed speed of the generator its frequency will vary in direct proportion to its number of poles. The generator is usually connected to supply a fixed frequency and hence it is not feasible to change its frequency. It is therefor desirable that the frequency be maintained at normal value and the speed of the generating unit be altered for better operating efficiency when the head of water varies and this result my invention accomplishes by changing the number of poles of the generator in a 2 to 3 ratio or vice versa. Thus, when the head of the water is about normal, for example, driving the water wheel generator at normal speed, then the generator may be connected for 2N poles and when the head is reduced materially the generator may be connected for 3N poles and operated at a correspondingly lower speed.

Certain types of battleships and cruisers are ordinarily propelled at normal or so-called cruising speeds but for obvious reasons they must have a maximum emergency speed of about 50% above cruising speed. It is well known to those skilled in the art that with a fixed frequency the speed of both synchronous and induction motors will vary in the inverse ratio at which their number of poles is increased or decreased.

In the past when induction motors were used for driving the ship propellers, the 50% increase in speed which is a 2 to 3 ratio was obtained by changing the poles on both stator and rotor in a 3 to 2 ratio. The induction motor has an undesirable low power factor and efficiency at the low speed, namely the cruising speed which these types of ships maintain most of the time. It is therefore highly desirable to use synchronous motors because they have a higher efficiency at this low speed and their power factor can be raised to unity for any synchronous speed, thus giving two efficient synchronous operating speeds and this result my invention accomplishes by changing the poles in a 3 to 2 ratio when the speed is to be increased 50% above normal, and conversely changing the poles in a 2 to 3 ratio when the speed is to be decreased to normal or cruising speed.

As compared to other schemes proposed to solve such problems my invention will have the advantages of being more efficient, a definitely smaller first cost, and less space required for installation.

My Patent No. 1,491,451, issued April 22, 1924, discloses a double speed synchronous dynamo electric machine, the method of obtaining a speed ratio of 1 to 2 being minutely explained. The above patent describes the advantages of a specially designed salient pole tip for improving the flux density distribution and I prefer to use pole tips of a somewhat similar design in my present invention. The salient pole construction is more economical than the cylindrical rotor construction and advantage is taken of this fact because of the low rotative speeds of ship propellers which permit salient pole construction.

My invention will be best understood from the following description taken in connection with the accompanying drawing while the features of my invention which are believed to be new and patentable are pointed out in the claims appended hereto. Fig. 1 represents the circuit connections of the multipolar field element of a two-speed synchronous dynamo electric machine embodying my invention. Throughout the drawing and text 2S indicates the normal speed of the machine, 3S indicates a speed 50% above normal, 3N indicates the number of poles at normal speed, and 2N indicates the number of poles at 50% above normal speed. Fig. 2 represents 2S speed and 3N poles; Fig. 2A represents 3S speed and 2N poles; Fig. 3 represents the assembly of one pair of salient poles with their magnetically symmerical pole tips facing each other and of similar polarity when connected for 3N poles; and Fig. 4 represents the same or similar poles with opposing polarities when connected for 2N poles.

Referring to Fig. 1, 1 represents the shaft of a multipolar synchronous dynamo electric machine of the revolving pole type, 2 and 3 represent the large and small salient poles respectively; the periphery being represented as laid out flat. 4 and 5 represent the two sets of slip rings. Four large and four small salient poles arranged in alternate pairs as shown in Fig. 1 constitute a field unit and any number of units can be used that will give the required number of poles. For the purpose of illustration I am showing a single field unit, arranged in two circuit connecting groups, the coils of one group being connected in series to slip rings 4 and the coils of the other group being connected in series to slip rings 5. To have the same current flow in each group the two sets of slip rings may be connected in series through a double pole reversing switch which enables the current in one group to be reversed as shown in Fig. 1. The field groups may be energized from any suitable direct current source.

In Fig. 1 the lettering at the upper end of the poles correspond to Fig. 2 and indicate the polarities with 3N poles; in this case any two adjacent small salient poles are of the same polarity and act as a single pole while the other two adjacent small salient poles act together to form a pole of the opposite polarity. By reversing the current supplied to either circuit group the polarities can be changed to 2N and in this case I selected for illustration a reversal of current in the circuit connected to slip rings 5 giving 2N poles as indicated by the lettering at the lower end of the poles and which correspond to Fig. 2A, in this case the adjacent small salient poles being of opposite polarity.

The stator windings of the machine have not been shown but it will be understood that they are wound so as to be capable of connecting for either 2N or 3N poles, N being any even number which may be accomplished by the method used in induction motors, for example as disclosed in United States Patent No. 841,609, said method being well known to those skilled in the art and needs no description here. When such a machine is started as a motor the field circuit will be open or short circuited through a resistance or reactance and the stator winding will be connected for 3N poles. When the machine reaches the speed corresponding to this connection the field windings may be energized for 3N poles if it is desired to operate at this condition. If it is desired to operate with the 2N pole condition the field circuit is left open or short circuited as before and the stator windings changed over by an appropriate pole changing switch to 2N poles and when the machine reaches the speed corresponding to this connection the field may be energized for the 2N pole condition. During both starting periods the potential induced across the slip rings will be only one-half of what it would be if the field windings were all connected in series to one set of slip rings and this is an evident advantage.

While I have described my invention in connection with a machine of the revolving pole type it is evident that the same is equally applicable to a machine in which the field is stationary and this is also true of machines with a different number of poles and therefore I do not wish to limit my invention to the type herein described. Also, while I have herein described my invention in connection with its use in water-wheel generators or as a synchronous motor for battleships and cruisers it is evident that the uses described herein are only illustrative of the invention and that the invention is equally applicable for use in any synchronous generator or synchronous motor whenever it is desired to change the poles in the herein described ratios and I therefore do not wish to limit my invention to the uses herein described.

In accordance with the provisions of the patent statutes I have described the principle of operation of my invention together with the apparatus which I now consider to represent the best embodiment thereof, but I desire to have it understood that such other modifications as fall fairly within the true spirit and scope of my invention are intended to be included in the scope of the appended claims.

What I claim as new and desire to secure by Letters Patent of the United States, is,—

1. A field element for a dynamo electric machine consisting of one or more field units, each unit composed of four large salient poles, and four small salient poles, said small salient poles being arranged in pairs and having magnetically symmetrical pole tops facing each other, said field element to consist of any number of field units necessary to obtain the desired number of poles.

2. A field element for a dynamo electric machine having alternate pairs of large and small salient poles, said pairs of poles being assembled with approximately equal pole arcs between the centers of adjacent large salient poles and between the centers of a large salient pole and the adjacent pair of small salient poles.

3. In a dynamo electric machine, a field element therefor consisting of 2N large salient poles and 2N small salient poles, N being any even number, each small salient pole having magnetically non-symmetrical pole tips, said small salient poles being arranged in pairs with their magnetically symmetrical pole tips facing each other, windings on said poles connected in two separate groups and energized by direct current, said windings being so connected that the current in one of the groups can be reversed causing said field element to be changed from 2N poles of alternate polarity to 3N poles of alternate polarity with adjacent small salient poles acting together as a single pole in the 3N pole connection or conversely the field element can be changed from 3N poles of alternate polarity to 2N poles of alternate polarity with the adjacent small salient poles of opposing polarity in the 2N connection.

4. A field element for a dynamo electric machine having alternate pairs of large salient poles and small salient poles, each pair of small salient poles having about the same metal section as one large salient pole and the said pairs of poles being assembled with approximately equal polar arcs between the centers of adjacent large salient poles and between the centers of a large salient pole and the adjacent pair of small salient poles.

5. A synchronous dynamo electric machine of a type having windings that may be connected for either 2N poles or 3N poles, N being any even number, said machine having a field element consisting of 2N large salient poles and 2N small salient poles, said poles being assembled alternately in pairs around the periphery, said poles being provided with windings connected in two circuit groups, said two groups so connected to a suitable source of direct current that the direction of current in one group may be reversed, thereby changing the field element from 3N poles of alternate polarity to 2N poles of alternate polarity, and vice versa.

6. A synchronous dynamo electric machine adapted to be connected for 2N poles or 3N poles, N being any even number, said machine having a field element comprising alternate pairs of large salient and small salient poles, direct current field windings on said poles, said windings being connected in two circuit groups, each circuit group including half of the large salient pole and half of the small salient pole windings, means for exciting said circuit groups from a direct current source, and means for reversing the current in one of the circuit groups to change the field element from 2N poles of alternate polarity to 3N poles of alternate polarity and vice versa.

In witness whereof, I have hereunto set my hand this 20th day of June, 1929.

ROBERT W. WIESEMAN.

CERTIFICATE OF CORRECTION.

Patent No. 1,752,871.　　　　　　　　　　　　　　Granted April 1, 1930, to

ROBERT W. WIESEMAN.

It is hereby certified that error appears in the printed specification of the above numbered patent requiring correction as follows: Page 2, line 126, claim 1, for the word "tops" read "tips"; and that the said Letters Patent should be read with this correction therein that the same may conform to the record of the case in the Patent Office.

Signed and sealed this 20th day of May, A. D. 1930.

(Seal)　　　　　　　　　　　　　　　　　　　M. J. Moore,
　　　　　　　　　　　　　　　　　　　Acting Commissioner of Patents.